United States Patent
Wells et al.

(10) Patent No.: US 9,816,304 B2
(45) Date of Patent: Nov. 14, 2017

(54) DOOR HINGE MECHANISM FOR TELECOMMUNICATIONS PANEL

(71) Applicant: ADC Telecommunications, Inc., Berwyn, PA (US)

(72) Inventors: Dennis Ray Wells, Richfield, MN (US); Rodney C. Schoenfelder, Shakopee, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/851,791

(22) Filed: Sep. 11, 2015

(65) Prior Publication Data

US 2016/0077297 A1    Mar. 17, 2016

Related U.S. Application Data

(60) Provisional application No. 62/049,189, filed on Sep. 11, 2014.

(51) Int. Cl.

| | |
|---|---|
| *G02B 6/00* | (2006.01) |
| *E05D 11/10* | (2006.01) |
| *E05D 3/12* | (2006.01) |
| *G02B 6/44* | (2006.01) |

(52) U.S. Cl.
CPC ............. *E05D 11/10* (2013.01); *E05D 3/12* (2013.01); *E05Y 2900/208* (2013.01); *E05Y 2900/602* (2013.01); *G02B 6/4453* (2013.01)

(58) Field of Classification Search
CPC .................................................. G02B 6/4452
See application file for complete search history.

(56) References Cited

U.S. PATENT DOCUMENTS

| | | |
|---|---|---|
| 4,840,449 A | 6/1989 | Ghandeharizadeh |
| 5,823,646 A | 10/1998 | Arizpe et al. |
| 5,913,352 A | 6/1999 | Scates et al. |

(Continued)

FOREIGN PATENT DOCUMENTS

| | | |
|---|---|---|
| GB | 2504281 A | 1/2014 |
| WO | WO 2011/094327 A1 | 8/2011 |

(Continued)

OTHER PUBLICATIONS

U.S. Appl. No. 62/027,657, filed Jul. 22, 2014 entitled "Door Hinge Mechanism for Telecommunications Panel."

(Continued)

*Primary Examiner* — Sung Pak
*Assistant Examiner* — Hoang Tran
(74) *Attorney, Agent, or Firm* — Merchant & Gould P.C.

(57) ABSTRACT

A double jointed hinge mechanism for pivotally coupling a door to a telecommunications chassis includes an first hinge arm configured to be non-rotatably attached to the chassis, a second hinge arm non-rotatably attached to the door, and a third hinge arm pivotally attached to the first and second hinge arms. The hinge mechanism is configured such that the door can be placed in a first open position and a second open position through rotation about first and second rotational axes. In the first open position, the door is in a generally horizontal position and below the first rotational axis. In the second open position, the door is in a generally vertical position and forward of a vertical plane defined by the first rotational axis.

18 Claims, 8 Drawing Sheets

(56) References Cited

U.S. PATENT DOCUMENTS

| | | | |
|---|---|---|---|
| 5,966,492 A | 10/1999 | Bechamps et al. | |
| D466,087 S | 11/2002 | Cuny et al. | |
| 7,570,860 B2 | 8/2009 | Smrha et al. | |
| 7,570,861 B2 | 8/2009 | Smrha et al. | |
| 7,873,252 B2 | 1/2011 | Smrha et al. | |
| 7,873,253 B2 | 1/2011 | Smrha et al. | |
| 8,229,265 B2 | 7/2012 | Solheid et al. | |
| 8,340,490 B2 | 12/2012 | Smrha et al. | |
| 8,346,044 B2 | 1/2013 | Smrha et al. | |
| 8,867,884 B2 | 10/2014 | Smrha et al. | |
| 8,886,335 B2 | 11/2014 | Pianca et al. | |
| 8,923,013 B2 | 12/2014 | Anderson et al. | |
| 8,934,252 B2 | 1/2015 | Anderson et al. | |
| 8,934,253 B2 | 1/2015 | Anderson et al. | |
| 8,953,921 B2 | 2/2015 | Smrha et al. | |
| 9,020,319 B2 | 4/2015 | Anderson et al. | |
| 9,097,871 B2 | 8/2015 | Smrha et al. | |
| 2005/0199354 A1 | 9/2005 | Marandon et al. | |
| 2006/0168759 A1 | 8/2006 | Laursen | |
| 2007/0189692 A1 | 8/2007 | Zimmel et al. | |
| 2008/0079341 A1 | 4/2008 | Anderson et al. | |
| 2008/0180004 A1 | 7/2008 | Martich et al. | |
| 2010/0054683 A1 | 3/2010 | Cooke et al. | |
| 2010/0296790 A1 | 11/2010 | Cooke et al. | |
| 2011/0268412 A1* | 11/2011 | Giraud | G02B 6/4452 385/135 |
| 2012/0267991 A1 | 10/2012 | Adducci et al. | |
| 2014/0208542 A1* | 7/2014 | White | E05D 7/12 16/261 |
| 2014/0219614 A1 | 8/2014 | Marcouiller et al. | |
| 2014/0219615 A1 | 8/2014 | Petersen et al. | |
| 2015/0177780 A1 | 6/2015 | Anderson et al. | |
| 2015/0195945 A1 | 7/2015 | Anderson et al. | |
| 2015/0219869 A1 | 8/2015 | Anderson et al. | |
| 2015/0245530 A1 | 8/2015 | Anderson et al. | |
| 2015/0286021 A1 | 10/2015 | Smrha et al. | |
| 2015/0331214 A1 | 11/2015 | Smrha et al. | |
| 2015/0331215 A1 | 11/2015 | Smrha et al. | |
| 2015/0331216 A1 | 11/2015 | Smrha et al. | |
| 2015/0370025 A1 | 12/2015 | Wells et al. | |
| 2016/0231525 A1 | 8/2016 | Murray et al. | |

FOREIGN PATENT DOCUMENTS

| | | |
|---|---|---|
| WO | WO 2011/100613 A1 | 8/2011 |
| WO | WO 2013/106820 A1 | 7/2013 |
| WO | WO 2016/012295 A1 | 1/2016 |

OTHER PUBLICATIONS

U.S. Appl. No. 61/707,323, filed Sep. 28, 2012 entitled "Fiber Optic Cassette."

International Search Report and Written Opinion for Application No. PCT/US2015/049785 dated Feb. 1, 2016.

* cited by examiner

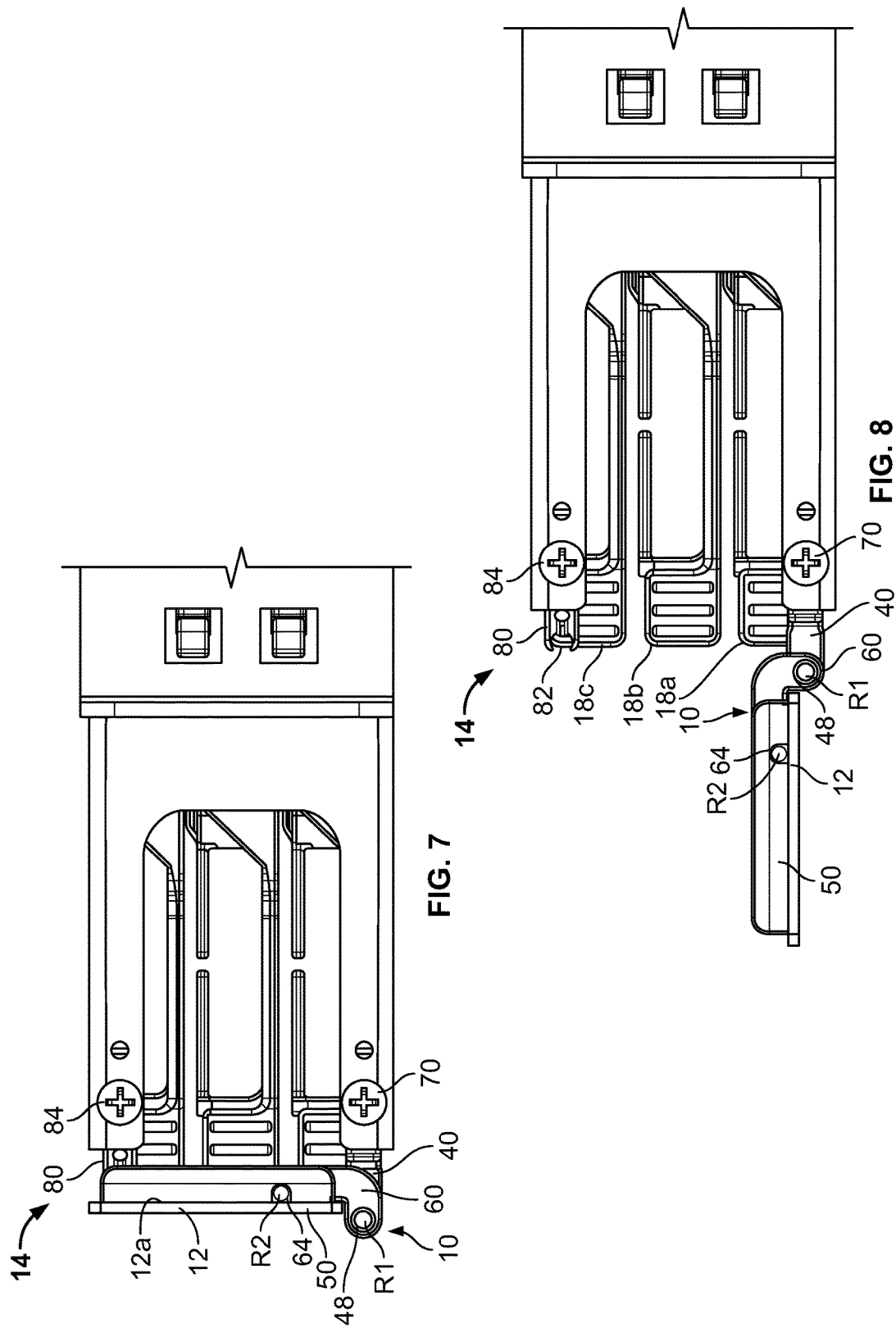

DOOR HINGE MECHANISM FOR TELECOMMUNICATIONS PANEL

RELATED APPLICATION

This application claims priority to U.S. Provisional Patent Application Ser. No. 62/049,189, filed on Sep. 11, 2014, the entirety of which is incorporated by reference herein.

BACKGROUND

As demand for telecommunications increases, fiber optic networks are being extended in more and more areas. Management of the cables, ease of installation, and ease of accessibility for later management are important concerns. As a result, there is a need for fiber optic devices which address these and other concerns.

SUMMARY

According to an inventive aspect, the present disclosure relates to a hinge mechanism for the door of a telecommunications chassis or panel, wherein the hinge mechanism is configured to allow the door of the chassis to be fully opened, allowing extension or removal of "pull-out" blades or trays installed in the chassis. According to an aspect of the disclosure, hinge mechanism may be used for a fiber optic chassis, wherein the "pull-out" trays may house fiber optic equipment in the form of fiber optic cassettes. Each cassette may include at least one connector that provides a signal entry location and at least one connector that provides a signal exit location and a fiber optical circuit thereinbetween for relaying the signal from the entry location to the exit location. The door hinge mechanism allows the trays to be fully pulled out of the chassis for access to the connectors of the cassettes.

According to another aspect, the present disclosure relates to a telecommunications system comprising a telecommunications chassis and a door pivotally attached to the chassis via a hinge mechanism. In one aspect, the hinge mechanism includes a first hinge arm affixed to the telecommunications chassis, a second hinge arm affixed to the door, and a third hinge arm. The third hinge arm may include a first extension portion pivotally attached to the first hinge arm and a second extension portion pivotally attached to the second hinge arm to provide a double jointed connection between the door and the chassis. In one example, the first extension portion meets the second extension portion at an angle to form a dog-leg shaped hinge arm.

In one embodiment, the hinge mechanism allows the door to be placed in multiple positions, such as a closed position, a first open position, and a second open position through the rotation of the hinge mechanism about a first rotational axis and a second rotational axis. In the closed position, the door is disposed in a generally vertical position to at least partially cover the open front of the chassis, wherein the door is located above a horizontal plane extending through the first rotational axis and behind a vertical plane extending through the first rotational axis. In the first open position, the door is disposed in a generally horizontal position, wherein the door is at least partially below the horizontal plane extending through the first rotational axis. In the second open position, the door is disposed in a generally vertical position and rotated from the closed position about the first rotational axis by about 180 degrees, wherein the door is disposed forward of the vertical plane extending through the first rotational axis.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 7 is a side view of the chassis of FIG. 1, the door of the chassis being in a closed position;

FIG. 8 is a side view of the chassis of FIG. 1, the door of the chassis being in an intermediate open position;

DETAILED DESCRIPTION

Figure 1:
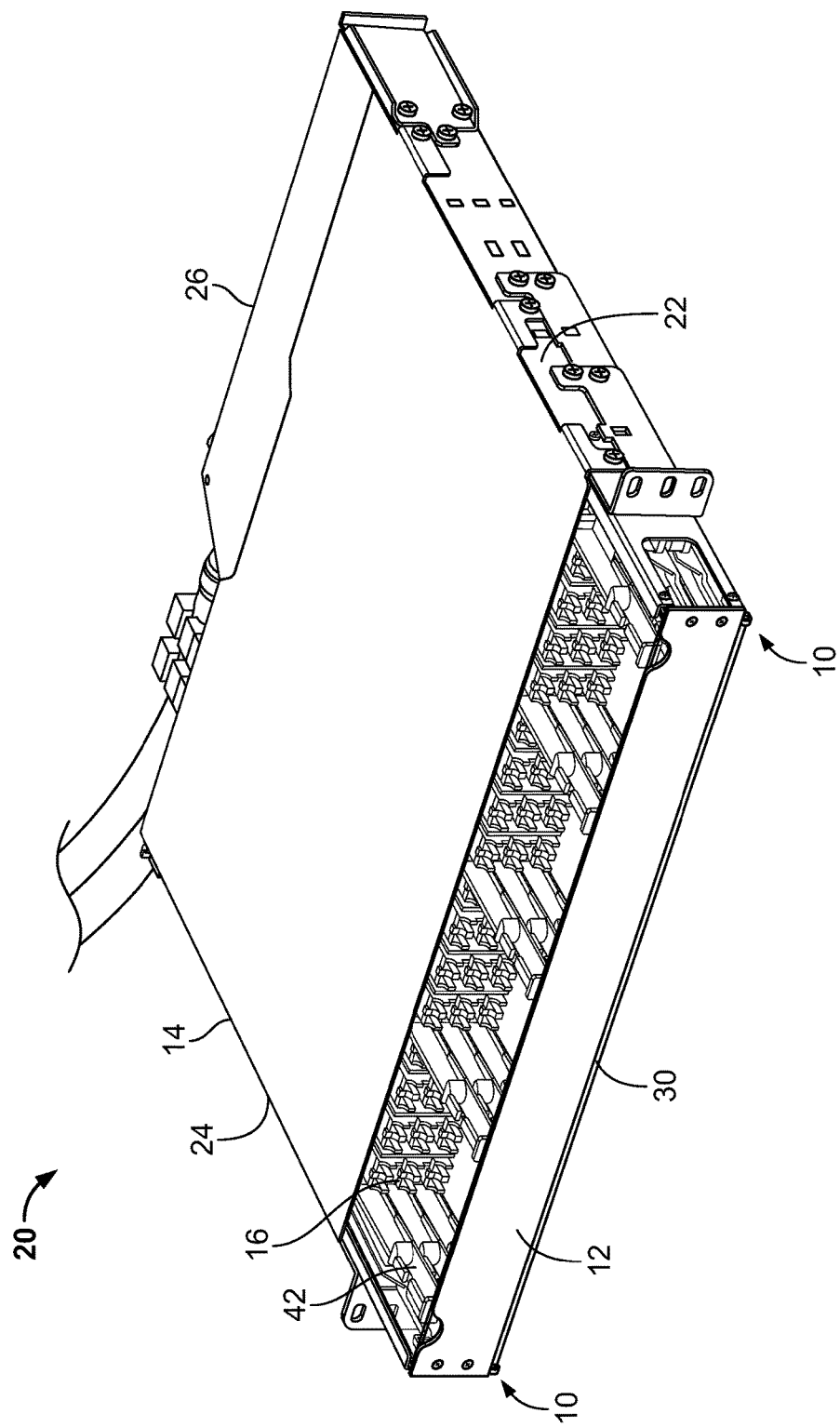
FIG. 1 is a top, front, right side perspective view of a fiber optic telecommunications chassis including a door hinge mechanism having features that are examples of inventive aspects in accordance with the present disclosure, the door of the chassis being in a closed position.
Figure 2:
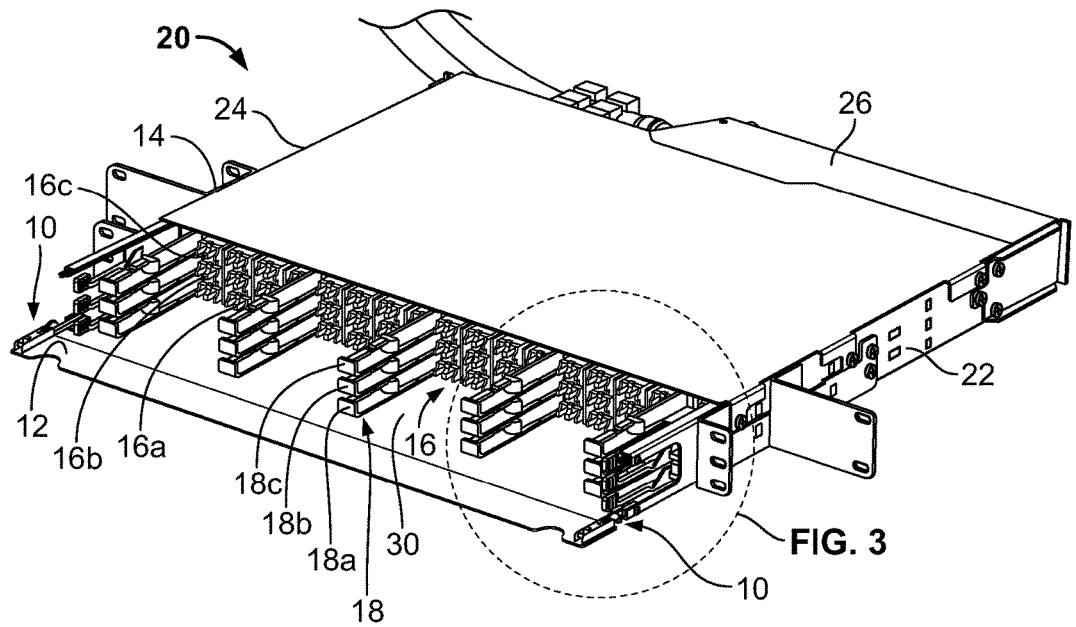
FIG. 2 is a top, front, right side perspective view of the fiber optic telecommunications chassis of FIG. 1, the door of the chassis being in a first open position.
Figure 4:
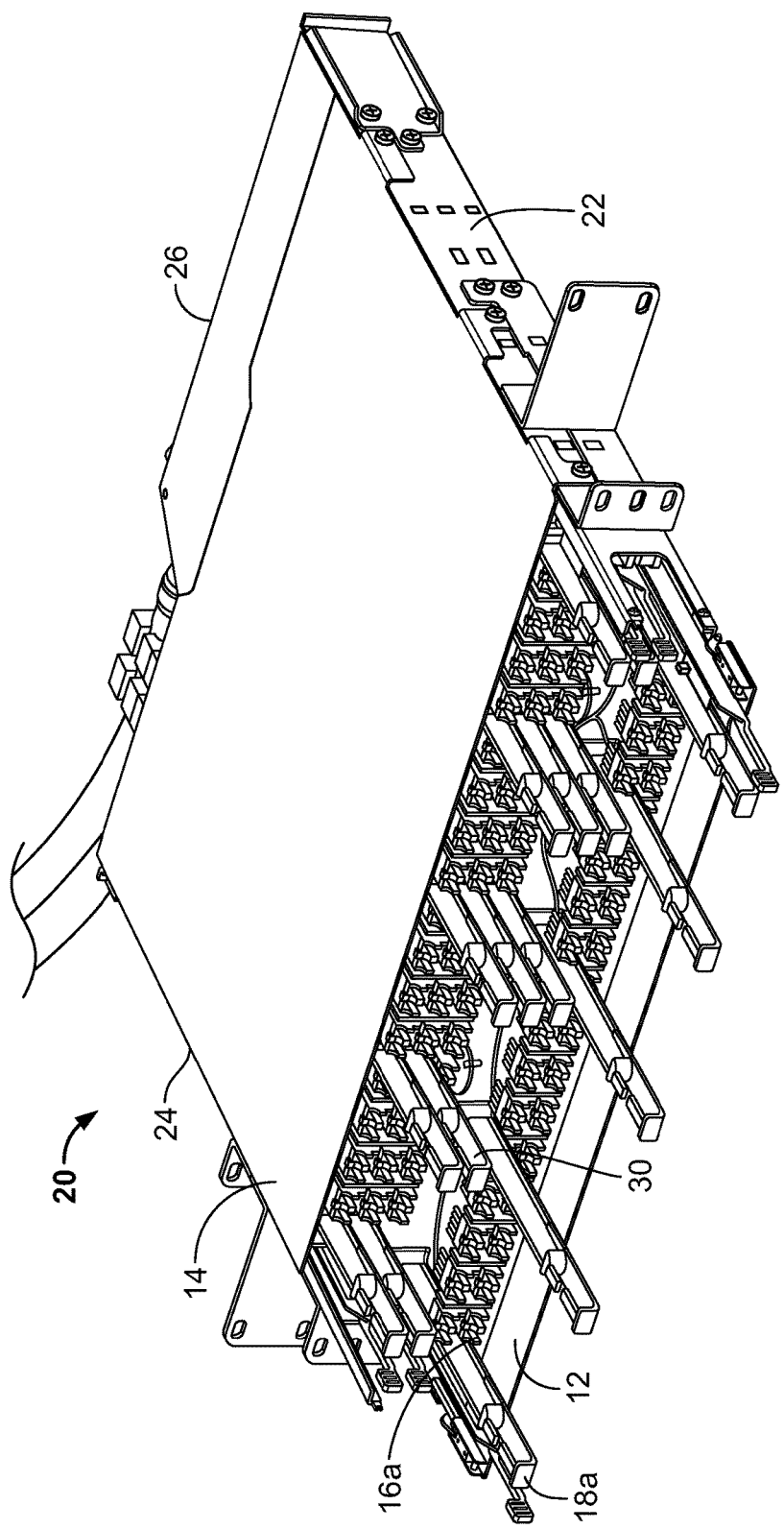
FIG. 4 is a top, front, right side perspective view of the fiber optic telecommunications chassis of FIG. 1, the door of the chassis being in a first open position and with a telecommunications tray shown fully extended.
Figure 5:
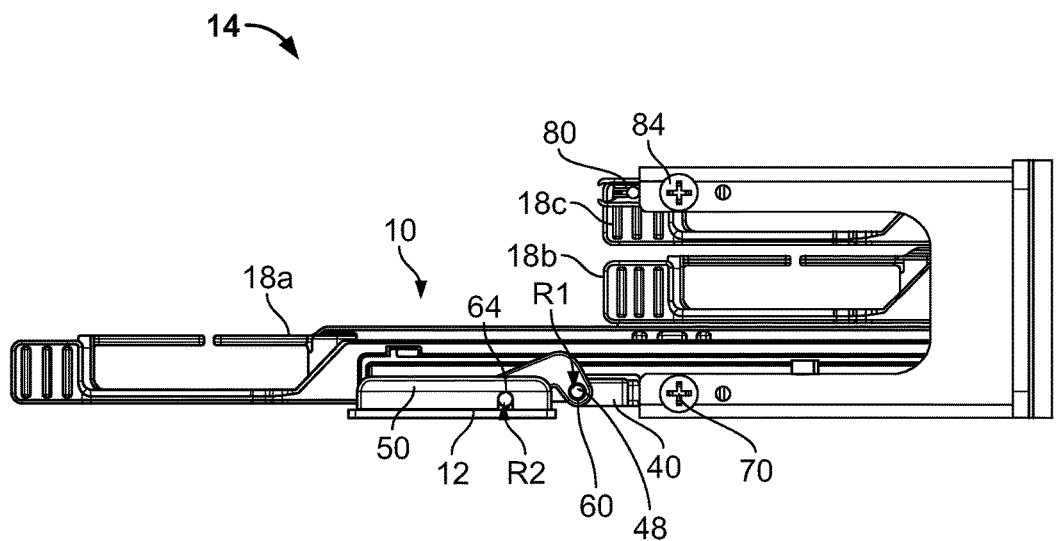
FIG. 5 is a side view of the chassis of FIG. 1 in the configuration shown in FIG. 4.
Figure 6:
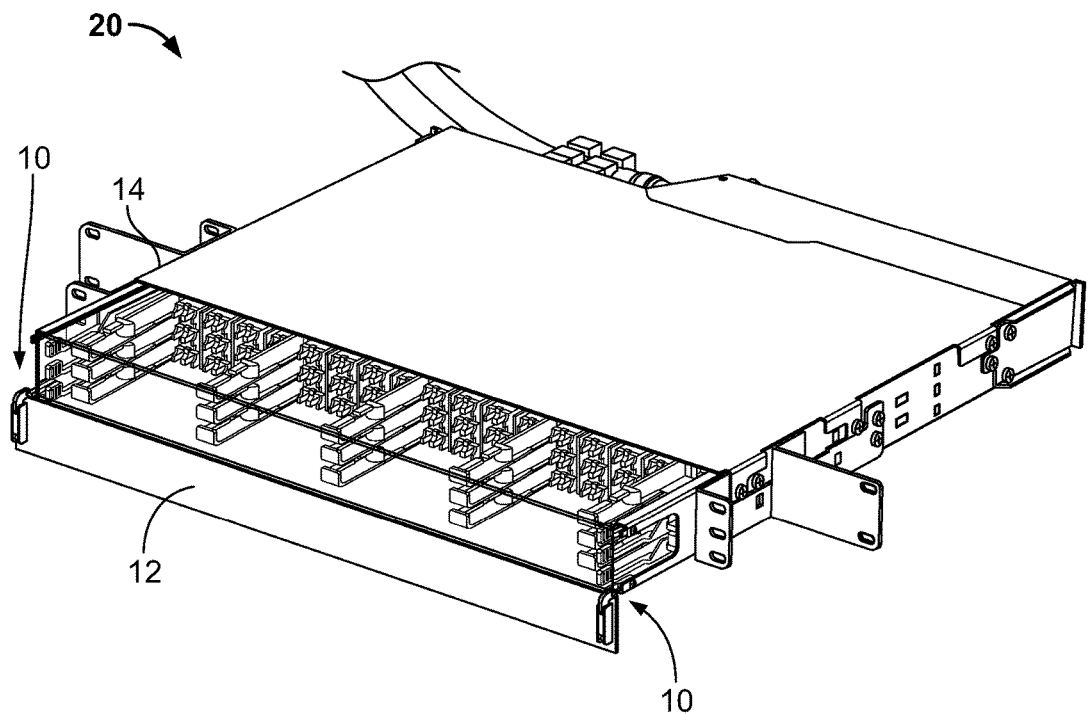
FIG. 6 is a top, front, right side perspective view of the fiber optic telecommunications chassis of FIG. 1, the door of the chassis being in a second open position.
Figure 9:
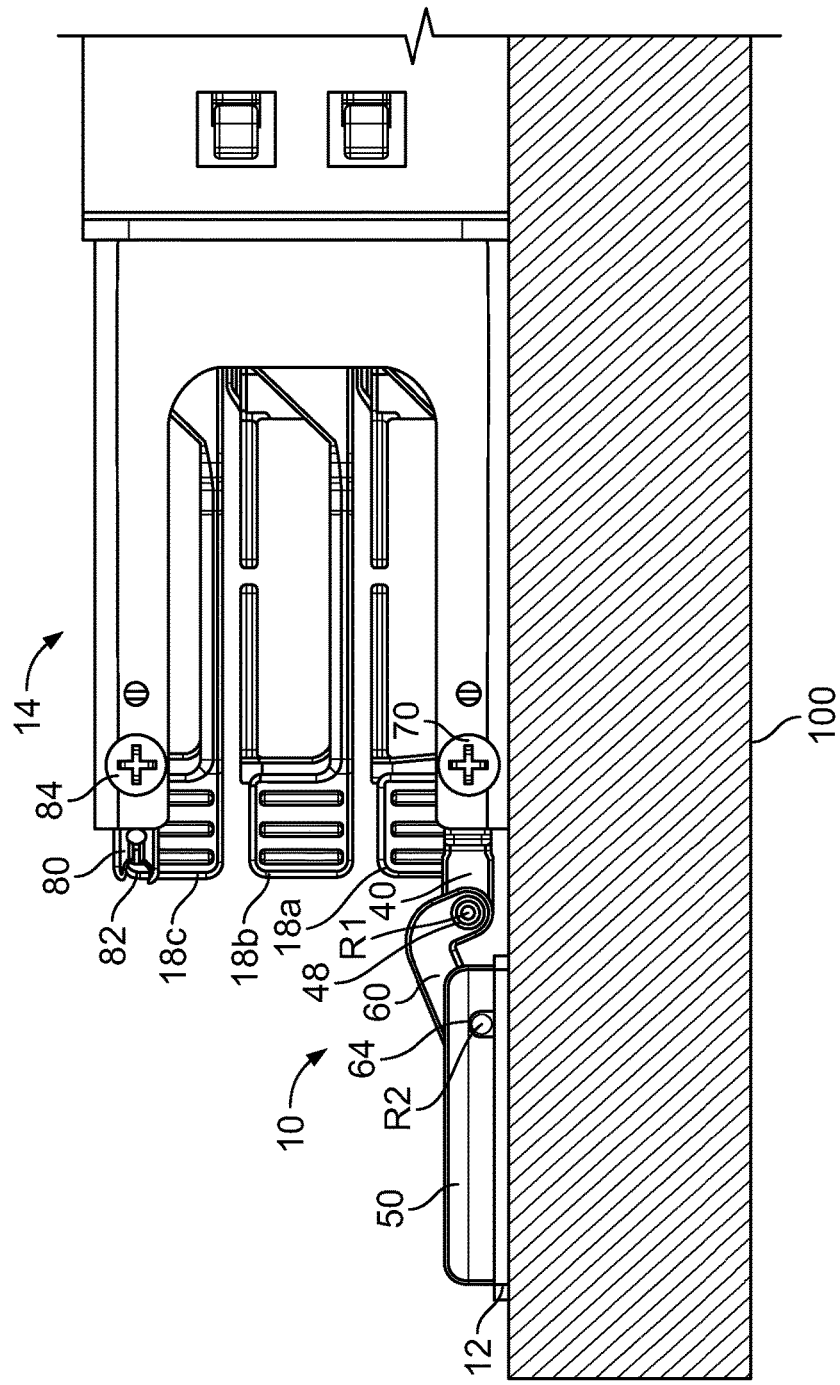
FIG. 9 is a side view of the chassis of FIG. 1, the door of the chassis being in the first open position.
Figure 10:
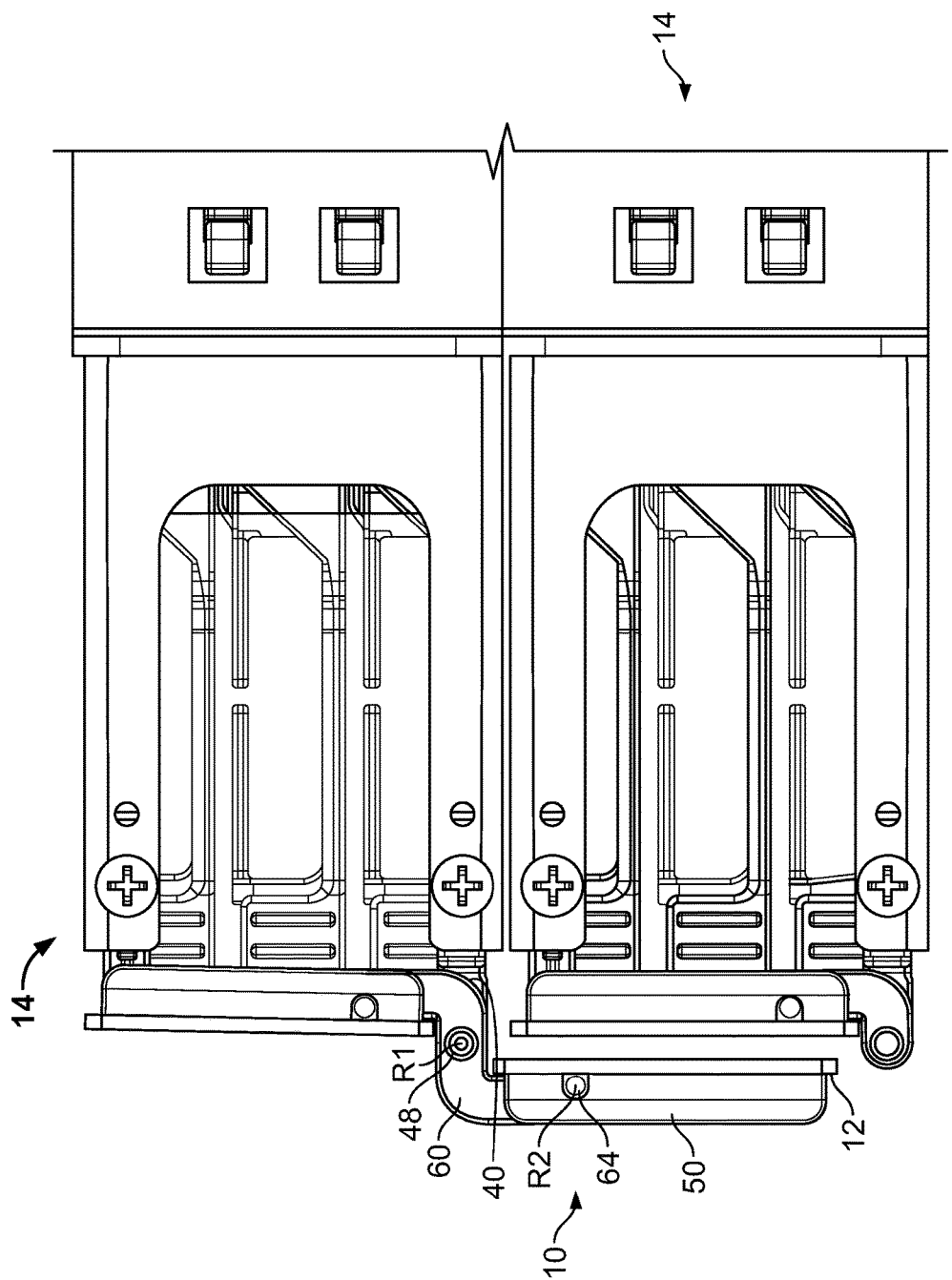
FIG. 10 is a side view of two of the chassis of FIG. 1 in a stacked configuration, the door of the bottom chassis being in the closed position, the door of the top chassis being shown in both the closed position and the second open position.

The present disclosure is directed to an inventive hinge mechanism 10 that can be used for a door 12, or a different cover structure, of a telecommunications chassis or panel 14 in a telecommunications system 20. The hinge mechanism 10 is configured to allow the door 12 of the chassis 14 to be moved between a fully closed position, as shown in FIGS. 1 and 7, to multiple open positions, as shown in FIGS. 2-6 and 8-10. The hinge mechanism 10 enables the door 12 to be opened sufficiently to allow the extension or removal of "pull-out" blades or trays 16 installed in the chassis 14 without interference from the door 12. In one aspect, the hinge mechanism 10 allows the door 12 to be placed in at least a first open position and a second open position. In the first open position, as shown at FIGS. 2-5 and 9, the door 12 can be rotated from the closed position and disposed into a generally horizontal position that is fully below any extended blades or trays 16 of the chassis 14. This position is advantageous where equipment below the chassis 14 (e.g. equipment 100 shown in FIG. 9) prevents the door 12 from rotating more fully open into the second position. In the second open position, as shown in FIGS. 6 and 10, the hinge mechanism 10 allows the door 12 to be disposed forward of equipment below the chassis 14 (e.g. another chassis 14) such that the door 12 can be placed in a generally vertical position and below any extended blades or trays 16 of the chassis 14.

According to an aspect of the disclosure, the hinge mechanism 10 may be used for a telecommunications chassis 14 in the form of a fiber optic chassis, wherein the "pull-out" trays 16 may house fiber optic equipment. According to one example embodiment, the fiber optic equipment housed by the trays 16 may be in the form of fiber optic cassettes. An example of a fiber optic chassis or panel 14 that includes "pull-out" blades or trays 16 that may utilize the door hinge mechanism 10 of the present disclosure is shown in FIGS. 1-10. It should be noted that although the door hinge mechanism 10 of the present disclosure may be used on and will be described with respect to the chassis or panel 14 described herein, the door hinge mechanism 10 may be utilized on any telecommunications chassis that may require access to equipment therein. The chassis 14 shown herein is simply an example of a type of chassis that may utilize the hinge mechanism 10 of the present disclosure. Chassis 14 of this configuration are particularly suitable for the hinge mechanism 10 of the present disclosure since they include "pull-out" trays or blades 16 that may need full opening of the doors 12 for accessing or removing the trays 16.

In one aspect of the disclosure, the telecommunications chassis 14 may be configured for mounting to a telecommunications rack that may be a standard 19-inch rack. According to the depicted embodiment, each chassis 14 is defined by a right wall 22, a left wall 24, a rear wall 26, and a top wall 28 that extends from the right wall 22 to the left wall 24. The chassis 14 defines an open front or face 30 that is closeable by the door 12. As shown, the open front or face 30 extends along and/or defines a plane that is generally vertical when the chassis 14 is horizontally disposed. The door 12 is mounted to the chassis 14 using the inventive hinge mechanism 10 of the present disclosure. The chassis 14 is configured to house slidable blades 16 (e.g. 16a, 16b, 16c) that can be provided with cable management devices 18 (e.g. 18a, 18b, 18c) and can be configured to hold fiber optic cassettes. Each chassis 14 may be configured to occupy a selected height, for example one standard rack unit (1RU) or two standard rack units (2RU).

Figure 12:
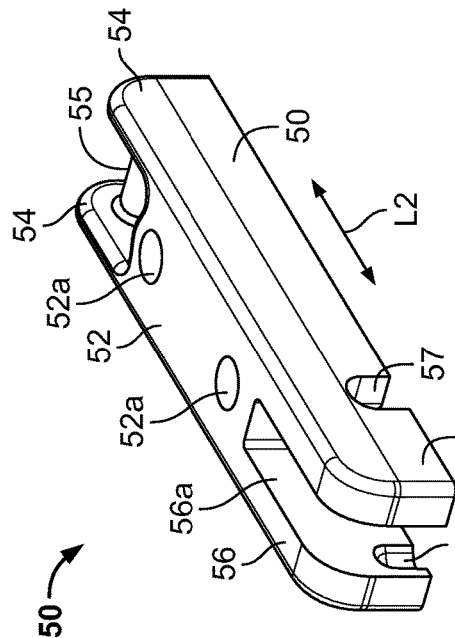
FIG. 12 is a perspective view of a second hinge arm of the door hinge mechanism of FIG. 1.
Figure 11:
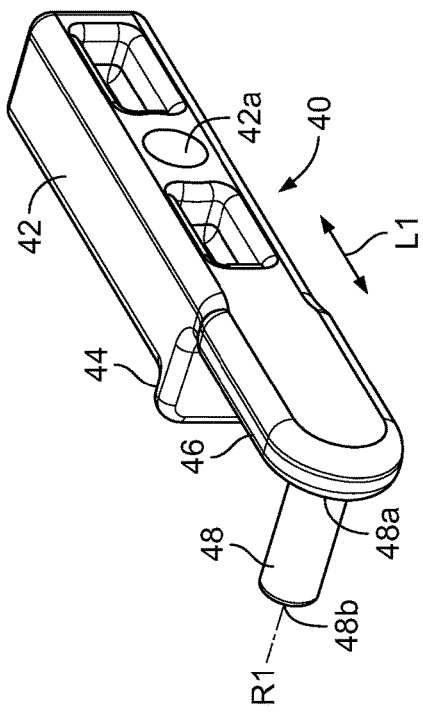
FIG. 11 is a perspective view of a first hinge arm of the door hinge mechanism of FIG. 1.
Figure 13:
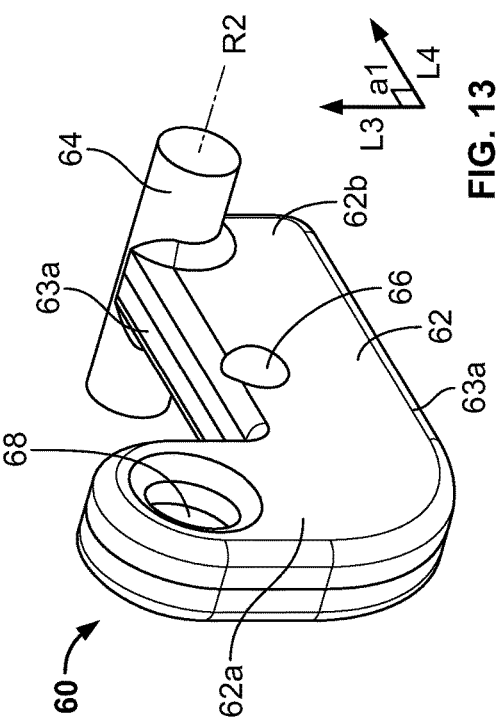
FIG. 13 is a perspective view of a third hinge arm of the door hinge mechanism of FIG. 1.

Now referring to FIGS. 11-13 close-up views of the individual components of the hinge mechanism 10 are shown. It should be noted that the hinge mechanism 10 includes the same configuration at both the right side and the left side of the chassis 14. For ease of description and illustration, only one side of the hinge mechanism 10 will be discussed in detail with the understanding that the features discussed are fully applicable to the other side.

As most easily seen at FIGS. 3, 8-9, and 11-13, the hinge mechanism 10 includes a first hinge arm 40, a second hinge arm 50, and a third hinge arm 60 that together form a double-jointed connection between the door 12 and the chassis 14.

Referring to FIG. 11, the first hinge arm 40 is shown in greater detail. In one aspect, the first hinge arm 40 has a main body 42, extending along a longitudinal axis L1, that is configured to be supported by and mounted to the chassis 14. As shown, the first hinge arm 40 is secured to the chassis 14 by one or more fasteners 70 passing through the chassis 14 and extending into a mounting aperture 42a of the first hinge arm 40. In one embodiment, the mounting aperture 42a is threaded and the fastener 70 is a screw that engages with the threads.

The main body 42 can also be provided with a lateral extension member 44 that engages with a portion of the chassis 14 so as to retain the desired longitudinal position of the first hinge arm 40 with respect to the chassis 14. The lateral extension member 44 also functions to absorb loading from the door 12 that would otherwise be absorbed by the fastener 70 and thus enhances the service life of the fastener connection. As shown, the lateral extension member 44 extends in a direction generally orthogonal to the axis L1.

The first hinge arm 40 also includes a longitudinal extension member 46 extending away from the main body 42 and generally parallel to axis L1. As shown, the longitudinal extension member 46 provides a support surface for a hinge post 48 that extends in a lateral direction transverse to the longitudinal extension member 46 and axis L1. The hinge post 48 is spaced from the main body 42 and provides for a pivotal connection point between the first hinge arm 40 and that third hinge arm 60. The third hinge arm 60 is shown as being provided with a radiused opening 68 through which the hinge post 48 extends. Thus, in the configuration shown, the third hinge arm 60 is rotatable with respect to the first hinge arm 40 about a rotational axis R1 that is coaxial with both the longitudinal axis of the hinge post 48 and the center of the radiused opening 68.

Figure 3:
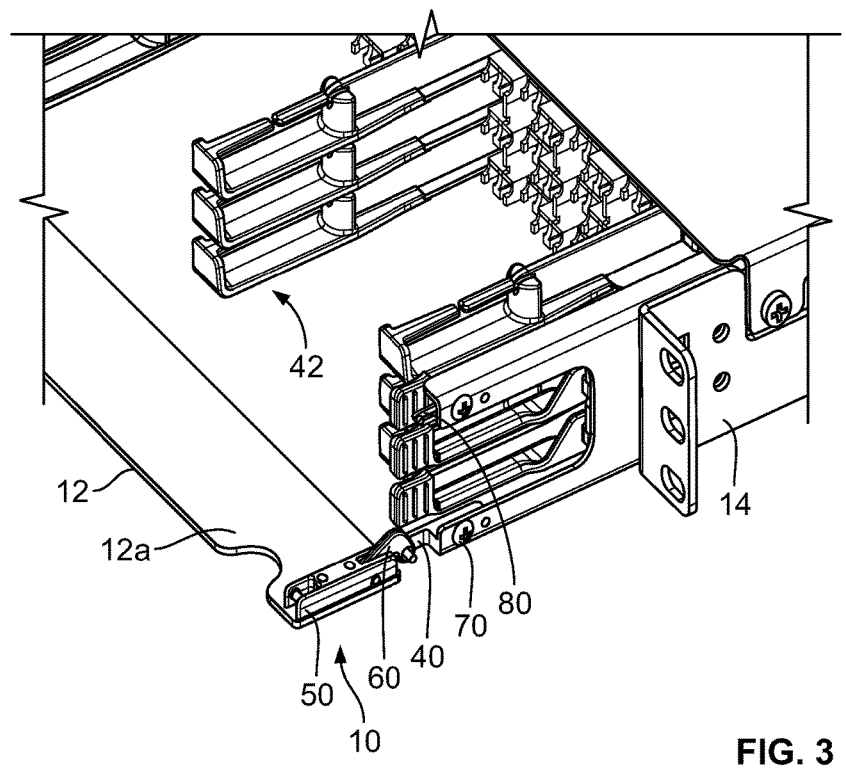
FIG. 3 is an enlarged view of a portion of the chassis shown in FIG. 2.
Figure 14:
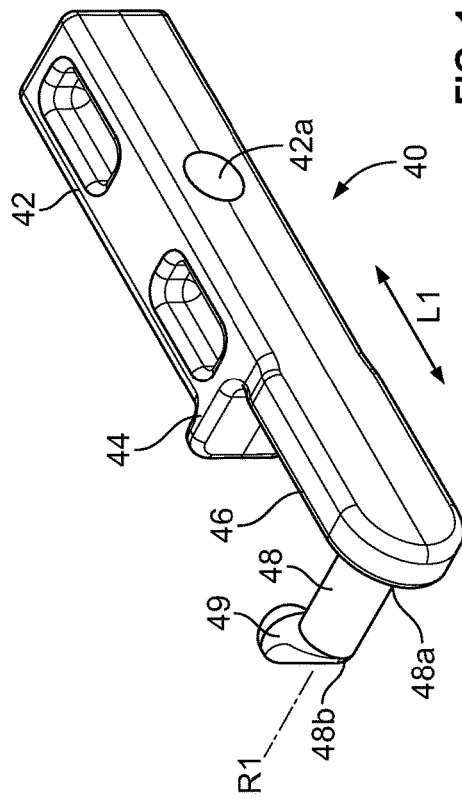
FIG. 14 is a perspective view of an alternative embodiment of the first hinge arm of FIG. 11.

In one aspect, the hinge post 48 is connected to the longitudinal extension member 46 at a first end 48a and has a free, second end 48b. However, it is noted that the first hinge arm 40 could include a second longitudinal extension member 46 extending from the main body 42 and connected to the second end 48b of the hinge post 48. In such a configuration, the third hinge arm 60 could be configured with an open ended female portion that could connect to the post member 48 via a snap-fit or other type of connection. In yet another alternative arrangement, and as shown at FIG. 14, the hinge post 48 can be provided with a hook or retaining portion 49 extending from the second end 48b of the hinge post 48. As shown, the hook or retaining portion 49 extends away from the hinge post 48 in a direction towards the lateral extension member 44 and acts to retain the third hinge arm 60 onto the hinge post 48. The hook or retaining portion 49 is shaped such that the hook or retaining portion 49 and the hinge post 48 can be passed through the opening 68 by rotating the third hinge arm 60 with respect to the first hinge arm 40 during installation. Once the first and third hinge arms 40, 60 are aligned in an installed position, for example as shown at FIG. 3, the hook or retaining portion 49 will prevent the third hinge arm 60 from sliding off of the hinge post 48 of the first hinge arm 40.

Referring to FIG. 12, the second hinge arm 50 is shown in greater detail. In one aspect, the second hinge arm 50 has a main body 52, extending along a longitudinal axis L2, that is configured to be supported by and mounted to the door 12. As shown, the second hinge arm 50 is secured to the door 12 by one or more fasteners (not shown) passing through the door and extending into mounting apertures 52a of the first hinge arm 40. In one embodiment, the mounting apertures 52a are threaded and the fasteners are screws that engage with the threads.

The second hinge arm 50 is also shown as being provided with a first pair of longitudinal extension members 54 extending from the main body 52 and generally parallel to axis L2. The extension member 54 supports a transversely (i.e. orthogonal to axis L2) mounted or formed latch post 55 that is spaced from the main body 52. The latch post 55 is configured to releasably engage with a corresponding latch member 80 mounted to the chassis 14. The latch member 80 is most easily viewed at FIGS. 8 and 9. Once engaged, the latch post and latch member 80 cooperate to retain the door 12 in the closed position. As shown, the latch member 80 includes a recessed portion 82 having an initial opening defining a smaller dimension than that of the latch post 55 such that a snap-fit type connection is achieved between the latch post 55 and the latch member 80. As shown, the latch member 80 is mounted to the chassis 14 via a fastener 84, such as a screw.

The second hinge arm 50 is also shown as being provided with a second pair of longitudinal extension members 56 extending away from the main body 52 at an end opposite the extension members 54. As shown, a slot opening 56*a* is defined between the longitudinal extension members 56 that allows for the third hinge arm 60 to be inserted partially into the second hinge arm 50.

Each of the longitudinal extension members 56 is also shown as being provided with a hinge recess 57 and a detent cavity 58. The hinge recesses 57 are configured to receive a hinge post 64 of the third hinge arm 60 such that the third hinge arm 60 and the second hinge arm 50 are rotatable with respect to each other. Thus, in the configuration shown, the second hinge arm 50 is rotatable with respect to the third hinge arm 60 about a rotational axis R2 that is coaxial with both the longitudinal axis of the hinge post 64 and the center of the hinge recess 57. In the embodiment shown, the second hinge arm main body 52 is mounted to the door 12 such that the hinge recesses 57 are adjacent to the interior surface 12*a* of the door 12 which prevents the hinge post 64 from being removable from the recesses 57 once the second hinge arm 50 is mounted to the door 12.

Each detent cavity 58 is configured to receive a corresponding detent protrusion 66 provided on the third hinge arm 60. Although two detent cavities 58 and detent protrusions 66 are provided in the embodiment shown in the drawings, it should be noted that a single detent cavity 58 and single corresponding detent protrusion 66 may be alternatively provided. In operation, the detent protrusions 66 and cavities 58 retain the third hinge arm 60 in an engaged, rotation-resistant position with respect to the second hinge arm 50. Once sufficient rotational pressure is applied to the hinge mechanism 10 via the door 12, the detent protrusions 66 are forced to disengage from their corresponding cavities 58, thereby allowing the second and third hinge arms 50, 60 become more easily rotatable with respect to each other.

It is noted that the length of the second hinge arm 50 can be selected to match the height of the door 12. In the example shown, the second hinge arm 50 is configured for a 1 RU height. However, the main body 52 could be simply made longer to match a 2 RU height or other height. Alternatively, multiples of the main body 52 could be mounted to the door in an aligned position to achieve the desired height. In such a configuration, two main bodies 52 could be used to achieve a 2 RU height in which the latch post 55 of the top arm main body 52 would be utilized and the hinge recesses 57 and detent cavities 56 of the lower arm main body 52 would be utilized in the assembly. This approach would allow for the same parts to be used regardless of the rack height which could reduce tooling and manufacturing costs.

Referring to FIG. 13, the third hinge arm 60 is shown in greater detail. As shown, the third hinge arm 60 is provided with a main body 62. The previously described opening 68 for the hinge post 48 of the first hinge arm 40 is provided on a first extension portion 62*a* of the main body 62 while the previously described hinge post 65 and detent protrusions 66 are provided on a second extension portion 62*b* of the main body 62.

In one aspect, the third hinge arm 60 is provided with a dog-leg shape or L-shape wherein the first extension portion 62*a* extends generally along a third axis L3 and the second extension portion 62*b* along a fourth axis L4 that is at a non-zero angle to the third axis L3. The first extension portion 62*a* meets the second extension portion 62*b* at a first angle a1. In the example shown, the first angle a1 is a right angle or about 90 degrees. However, other non-zero angles may be utilized depending upon the specific physical configuration of the door 12 and door hinge mechanism 10.

Referring back to FIGS. 1 and 7, it can be seen that the door 12 is in the closed position such that the interior surface 12*a* of the door is facing the open front 30 of the chassis 14 and such that the latch post 55 is engaged with the latch member 80. When the door 12 is in the closed position, the door hinge mechanism 10 is oriented such that the first extension portion 62*a* of the third hinge arm 60 is aligned generally parallel with the main body 42 of the first hinge arm 40 (i.e. axis L3 is generally parallel to axis L1). Additionally, the second extension portion 62*b* of the third hinge arm 60 is aligned generally parallel with the main body 52 of the second hinge arm 50 (i.e. axis L2 is generally parallel to axis L4) such that the detent protrusions 66 are engaged with the cavities 58. Thus, the door hinge mechanism 10 is in the engaged position when the door 12 is in the closed position. It is noted that the engaged position of the door hinge mechanism 10 allows for the weight of the door 12 to be largely supported from the hinge posts 48. This configuration reduces shear stresses on the latch members 80 (and the latch posts 55) and serves to extend the useful service life of the latch members 80. It is also noted that the interior surface 12*a* of the door 12 closes off the open side of the detent cavities 58 and provides for a rotational stop against the second extension portion 62*b* of the third hinge arm 60.

Referring to FIG. 8, it can be seen that the door 12 has been rotated into an intermediate open position, wherein the door hinge mechanism 10 has been rotated about the first rotational axis R1 and the door hinge mechanism 10 remains in the engaged position. As shown, the door 12 is in a generally horizontal position and the second extension portion 62*b* of the third hinge arm 60 is generally parallel to the main body 42 of the first hinge portion 40 (i.e. axes L1 and L4 are generally parallel). However, the intermediate open position can include any position in which the door hinge mechanism 10 is in the engaged position and at least some portion of the door 12 is above or in front of the bottom tray 16*a* and/or related cable management feature 18*a*. For example, the door 12 can be said to be in the intermediate position where the door has been rotated more than 90 degrees such that the top edge of the door is resting on equipment 100 located below the chassis that extends beyond the open front 30 of the chassis 14.

Although the intermediate position allows for upper components within the chassis (e.g. upper trays 16*b*, 16*c* and their related cable management features 18*b*, 18*c*) to be extended through the open front 30, lower components (e.g. the bottom tray 16*a* and its cable management feature 18*a*) may be blocked from extending fully outward by the door 12. Although the dog-leg or L-shape of the third hinge arm 60 is beneficial for offsetting the position of the door 12 in the second open position (discussed later), this shape also effectively raises the height of the door 12 when in the intermediate position, resulting in components that may blocked from fully extending.

To ensure that all components within the chassis 14 can be extended through the open front 30, even when the door 12 cannot be further rotated about rotational axis R1, the door 12 can be placed in a first open position. The first open position of the door 12 can be seen at FIGS. 2-5 and 9. The door 12 can be placed in the first open position by disengaging the detent protrusions 66 from the detent cavities 58 by applying a sufficient rotational force to the door 12 against the third hinge arm 60. Once the detent protrusions 66 and cavities 58 are disengaged, the second hinge arm 50 can be easily rotated about the second rotational axis R2 with respect to the third hinge arm, thereby allowing the door 12 to reach a lowered generally horizontal position, as compared to when the door hinge assembly 10 is in the engaged position. It is noted that rotation about the first rotational axis R1 is still possible in the disengaged position which can be seen in the difference in relative positions of the first and third hinge arms 40, 60 between FIGS. 8 and 9. As can be seen at FIG. 9, the door 12 is generally aligned with the bottom of the chassis 14 or the top of the equipment 100 below the chassis 14.

As shown, the disengaged position of the hinge mechanism 10 includes the third extension portion 62b of the third hinge arm 60 being disposed at a non-zero angle with respect to the main body 52 of the second hinge arm 50 (i.e. axes L2 and L4 are not parallel). It is noted that the main body 52 adjacent the slot opening 56a functions to provides a rotational stop against the second extension portion 62 of the third hinge arm 60 to define a limit on the degree to which the door 12 can be rotated with respect to the third hinge arm 60. Accordingly, the second and third hinge arms 50, 60 can be configured such that rotation between them is stopped when the door 12 is held in a horizontal position sufficiently below the open front 30.

As can be most easily seen at FIG. 8, the door 12 is in a generally horizontal position that is at least partially above the rotational axis R1 and hinge post 48 when the door hinge assembly 10 is in the engaged position. In contrast, and as most easily seen at FIG. 9, the door 12 can be maintained in a generally horizontal position that is lower than the rotational axis R1 and the hinge post 48 when the door hinge assembly 10 is in the disengaged position (i.e. the door 12 is below a horizontal plane extending through the center of the hinge post 48). Accordingly, the first open position allows the door 12 to be lowered such that the door 12 does not block the open front 30 of the chassis 14 without requiring the door 12 to be rotated past a horizontal position (which may not be possible if equipment 100 below the chassis would prevent such rotation). Referring to FIGS. 4 and 5, it can be seen that the first open position allows for the bottom tray 16a and the related cable management feature 18a to extend beyond the open front 30 of the chassis 14.

As shown at FIGS. 6 and 10, the door 12 can be further rotated into a second open position. In the second open position, the door hinge mechanism 10 is placed or maintained in the engaged position and the door 12 is rotated about the rotational axis R1 into a generally vertical orientation that is about 180 degrees from the closed position. However, and as noted previously, the dog-leg or L-shape of the third hinge arm 60 allows the door 12 to be displaced forward such that it can overlay the front face of equipment below the chassis 14, such as another chassis 14. Such a configuration can be seen at FIG. 10 wherein the open door 12 of the upper chassis 14 is in the second open position without contact or interference from the door 12 of the chassis 14 below. Such a configuration allows the hinge posts 48 to bear the load of the door 12 without additional shear forces being imparted into the door hinge mechanism 10 by the equipment or chassis below.

Similar to the closed position, when the door 12 is in the second open position position, the door hinge mechanism 10 is oriented such that the first extension portion 62a of the third hinge arm 60 is aligned generally parallel with the main body 42 of the first hinge arm 40 (i.e. axis L3 is generally parallel to axis L1) and the second extension portion 62b of the third hinge arm 60 is aligned generally parallel with the main body 52 of the second hinge arm 50 (i.e. axis L2 is generally parallel to axis L4) such that the detent protrusions 66 are engaged with the cavities 58. However, the first extension portion 62a, when the door 12 is in the second open position, is oriented 180 degrees with respect to the orientation of the first extension portion 62a when the door 12 is in the closed position.

The door 12 and the door hinge mechanism 10 can be assembled such that the door is not removable from the chassis 14 without removing at least one of the fasteners 70. This is most easily accomplished by mounting the first hinge members 40 such that the hinge posts 48 are facing in opposite directions. For example, the first hinge members 40 can be mounted to the chassis 14 such that the second ends 48b of the hinge posts 48 face each other in a direction towards the center of the chassis 14 or can be mounted to the chassis 14 such that the second ends 48b face away from each other in a direction away from the center for the chassis 14. Fasteners can also be used on the hinge posts 48 to prevent removal of the door from the door hinge mechanisms 10 as well. Alternatively, the door hinge mechanism 10 and door 12 can be assembled such that the door 12 is removable from the chassis without having to remove one or both fasteners 70. This can be accomplished by mounting the first hinge members 40 such that the second ends 48b of the hinge posts 48 extend in the same direction which would allow the door to be laterally displaced along the hinge posts 48 for removal.

The hinge arms 40, 50, 60 of the door hinge mechanism 10 may be made of many different materials, for example, metal materials and plastics. Further, the arms may be produced by a variety of processes, for example, molding, casting, machining, and three-dimensional printing.

Although in the foregoing description, terms such as "top," "bottom," "front," "back," "right," "left," "upper," and "lower" were used for ease of description and illustration, no restriction is intended by such use of the terms. The telecommunications devices described herein can be used in any orientation, depending upon the desired application.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

The invention claimed is:

1. A door hinge mechanism for pivotally coupling a door to a telecommunications chassis, the hinge mechanism comprising:

a) a first hinge arm configured to be non-rotatably affixed to the telecommunications chassis;

b) a second hinge arm configured to be non-rotatably affixed to the door; and
c) a third hinge arm having a first extension portion pivotally attached to the first hinge arm and having a second extension portion pivotally attached to the second hinge arm, the first extension portion meeting the second extension portion at an angle to form a dog-leg shaped hinge arm;
d) wherein the third hinge arm is rotatable with respect to the first hinge arm about a first rotational axis and is rotatable with respect to the second hinge arm about a second rotational axis and wherein the first pivot axis is vertically below the second pivot axis when the door hinge mechanism is placed in a fully closed position and the first pivot axis is vertically above the second pivot axis when the door hinge mechanism is placed in a fully open position.

2. The door hinge mechanism of claim 1, wherein the door hinge mechanism further includes a detent structure to resist rotation between the third hinge arm and the second hinge arm about the second rotational axis.

3. The door hinge mechanism of claim 2, wherein the detent structure includes a detent protrusion located on one of the first and second hinge arms and a detent cavity located on the other of the first and second hinge arms.

4. The door hinge mechanism of claim 3, wherein the door hinge mechanism is positionable into an engaged position in which the detent protrusion engages with the detent cavity, and wherein the door hinge mechanism is positionable into a disengaged position in which the detent protrusion is disengaged from the detent cavity.

5. The door hinge mechanism of claim 1, wherein the second hinge member further includes a latch post configured to engage with a latch recess of the chassis to releasably retain the door in the closed position.

6. The door hinge mechanism of claim 1, wherein first hinge arm is pivotally attached to the third hinge arm by a hinge post located on the first hinge arm that is received by an opening extending through the third hinge arm.

7. The door hinge mechanism of claim 6, wherein the second hinge arm is pivotally attached to the third hinge arm by a second hinge post located on the second hinge arm that is received by a recess defined in the second hinge arm.

8. The door hinge mechanism of claim 7, wherein the second hinge arm further includes a slot opening into which the third hinge arm is received.

9. A telecommunications system comprising:
a) a telecommunications chassis defining an open front face;
b) a door pivotally attached to the telecommunications chassis via a hinge mechanism, the hinge mechanism comprising:
i) a first hinge arm affixed to the telecommunications chassis;
ii) a second hinge arm affixed to the door; and
ii) a third hinge arm having a first extension portion pivotally attached to the first hinge arm and having a second extension portion pivotally attached to the second hinge arm, the first extension portion meeting the second extension portion at an angle to form a dog-leg shaped hinge arm;
c) wherein the third hinge arm is rotatable with respect to the first hinge arm about a first rotational axis and is rotatable with respect to the second hinge arm about a second rotational axis and wherein the first pivot axis is vertically below the second pivot axis when the door hinge mechanism is placed in a fully closed position and the first pivot axis is vertically above the second pivot axis when the door hinge mechanism is placed in a fully open position.

10. The telecommunications system of claim 9, wherein the door hinge mechanism further includes a detent structure to resist rotation between the third hinge arm and the second hinge arm about the second rotational axis.

11. The telecommunications system of claim 10, wherein the detent structure includes a detent protrusion located on one of the first and second hinge arms and a detent cavity located on the other of the first and second hinge arms.

12. The telecommunications system of claim 11, wherein the door hinge mechanism is positionable into an engaged position in which the detent protrusion engages with the detent cavity, and wherein the door hinge mechanism is positionable into a disengaged position in which the detent protrusion is disengaged from the detent cavity.

13. The telecommunications system of claim 9, wherein the second hinge member further includes a latch post configured to engage with a latch recess of the chassis to releasably retain the door in the closed position.

14. The telecommunications system of claim 9, wherein first hinge arm is pivotally attached to the third hinge arm by a hinge post located on the first hinge arm that is received by an opening extending through the third hinge arm.

15. The telecommunications system of claim 14, wherein the second hinge arm is pivotally attached to the third hinge arm by a second hinge post located on the second hinge arm that is received by a recess defined in the second hinge arm.

16. The telecommunications system of claim 15, wherein the second hinge arm further includes a slot opening into which the third hinge arm is received.

17. A telecommunications system comprising:
a) a telecommunications chassis having an open front extending along a first plane;
b) a hinge mechanism pivotally attached to the telecommunications chassis, the hinge mechanism being rotatable with respect to the telecommunications chassis about a first rotational axis;
c) a door pivotally attached to the hinge mechanism, the door being rotatable with respect to the hinge mechanism about a second rotational axis, the door being positionable between:
i) a closed position in which the door is disposed in a generally vertical position to at least partially cover the open front of the chassis, wherein the door is located above a horizontal plane extending through the first rotational axis and behind a vertical plane extending through the first rotational axis; and
ii) a first open position in which the door is disposed in a generally horizontal position, wherein the door is at least partially below the horizontal plane extending through the first rotational axis.

18. The telecommunications system of claim 17, wherein:
a. The door is further positionable to a second open position in which the door is disposed in a generally vertical position and rotated from the closed position about the first rotational axis by about 180 degrees, wherein the door is disposed forward of the vertical plane extending through the first rotational axis.

* * * * *